United States Patent
Lu

(10) Patent No.: US 7,375,943 B2
(45) Date of Patent: May 20, 2008

(54) TRI-PHASE SURGE PROTECTOR AND ITS MANUFACTURING METHOD

(76) Inventor: Yung-Hao Lu, No. 3, Lane 346, Puding Rd., Neighborhood 17, Puding Village, Hsinchu City 300 (TW)

( * ) Notice: Subject to any disclaimer, the term of this patent is extended or adjusted under 35 U.S.C. 154(b) by 267 days.

(21) Appl. No.: 11/284,014

(22) Filed: Nov. 22, 2005

(65) Prior Publication Data

US 2007/0217110 A1   Sep. 20, 2007

(51) Int. Cl.
*H02H 1/00* (2006.01)
*H01C 7/10* (2006.01)

(52) U.S. Cl. .......................... 361/126; 338/21
(58) Field of Classification Search ............... 361/126; 338/21, 328
See application file for complete search history.

(56) References Cited

U.S. PATENT DOCUMENTS 3,768,058 A * 10/1973 Harnden, Jr. ............ 338/20
4,212,045 A * 7/1980 Martzloff ................ 361/127
6,507,268 B2 * 1/2003 McLoughlin ............ 338/21

FOREIGN PATENT DOCUMENTS

JP    2001308348 A  * 11/2001
JP    2002112559 A  *  4/2002

* cited by examiner

*Primary Examiner*—Michael Sherry
*Assistant Examiner*—Scott Bauer
(74) *Attorney, Agent, or Firm*—Troxell Law Office, PLLC

(57) ABSTRACT

A tri-phase surge protector comprises a first zinc oxide ceramic body; a first electrode layer on a surface of the first zinc oxide ceramic body and having a first electrode, and the first electrode includes a first terminal; a second electrode layer on another surface of the first zinc oxide ceramic body; a second zinc oxide ceramic body on the second electrode layer; a third electrode layer on another surface of the second zinc oxide ceramic body and having a second electrode, and the second electrode includes a second terminal; a third zinc oxide ceramic body on the second electrode layer and at the second zinc oxide ceramic body; and a fourth electrode layer on another surface of the third zinc oxide ceramic body and having a third electrode, and the third electrode includes a third terminal. The invention also discloses a method for manufacturing a tri-phase surge protector.

12 Claims, 5 Drawing Sheets

TRI-PHASE SURGE PROTECTOR AND ITS MANUFACTURING METHOD

BACKGROUND OF THE INVENTION

1. Field of the Invention

The present invention relates to a tri-phase surge protector and its manufacturing method, and more particularly to a tri-phase surge protector and its manufacturing method that design a three-wire L-N-G protection on a zinc oxide ceramic body to improve the life and reliability.

2. Description of the Related Art

Referring to FIG. 1 for a bottom view and a side view of a prior art surge protector, the prior art surge protector includes a zinc oxide ceramic plate 6 having a conductive layer 7a on both top and bottom sides of the zinc oxide ceramic plates, a copper wire 8 (usually a tin plated copper wire) soldered on an electrode surface 7, an epoxy resin powder coated on an external layer for insulating electric charges and resisting moisture. The operating principle of the prior art surge protector uses a grain boundary phenomenon of the zinc oxide ceramic plate 6 to protect a voltage surge occurred at both ends and discharge surge energy by dissipating the heat, and thus its operation has to produce an electric current passing through the body of the zinc oxide ceramic plate 6 to convert surge energy into heat.

Referring to FIG. 2 for the schematic view of using a prior art surge protector to protect a three-wire L-N-G power supply, the surge protector is traditionally used for protecting a three-wire L-N-G power supply. Generally, three independent surge protectors 9 are used for protecting the power supply from being damaged by a surge occurred in the L-N-G terminals, wherein each surge protector 9 independently completes the protection between two wires.

Refer to FIGS. 3(a), 3(b), and 3(c) respectively for the bottom view, the side view, and the schematic equivalent circuit diagram of a three-terminal single-layer device as disclosed in JPN Pat. No. 59-5601, JPN Pat. No. 59-5601 based on the purpose of simplifying the circuit to design a three-terminal single-layer device 100. From its appearance, the three-terminal single-layer device 100 includes three terminals d, e, f, but the equivalent circuit diagram as shown in FIG. 3(c) shows that such method only protects the terminals d-f, and e-f, and there is no appropriate protection between the terminals d-e. Since there is no physical volume (grain boundary) between d and e for passing the terminal, therefore a breakdown will occur at d with respect to e under an appropriate electric field, and the surge energy cannot be removed by dissipating heat. There is no equivalent surge protector existed between d and e in the equivalent circuit diagram as shown in FIG. 3(c), and thus the design is incomplete for the protection.

Referring to FIGS. 4(a) and 4(b) respectively for the bottom view and the side view of a three-terminal single-layer device as disclosed in R.O.C. Pat. No. 313713, R.O.C. Pat. No. 313713 improved the design of the three-terminal single-layer device 120 as depicted in FIG. 3. From its appearance, the three-terminal single-layer device 120 includes three terminals g, h, k. In FIGS. 4(a) and 4(b), if an abnormal voltage occurs at each time of starting, it is necessary to have a breakdown (which produces a current) occurred at a terminal (assumed to be g in this embodiment) of the electrode 121 with respect to the electrode 123 on another side, and the electrode 123 produces a second breakdown (which produces a current) occurred at a terminal h of the electrode 122 or a terminal K of the electrode 123, and thus it is necessary to pass the current through the ceramic body twice for protecting the device each time. In other words, it is necessary to use the original designed area (121, 122 and 123) twice (121+122 or 122+123 or 121+123) to complete the protecting function. Such arrangement not only lowers the reliability, but also provides a resistance much smaller than three independent surge protectors (having a working area equal to 121 or 122 or 123) under the same lightning strike condition because the equivalent area is half of the original design.

Therefore, the present invention provides a tri-phase surge protector and its manufacturing method that design a three-wire L-N-G protection on a zinc oxide ceramic body to improve the product life and reliability.

SUMMARY OF THE INVENTION

The primary objective of the present invention is to provide a tri-phase surge protector and its manufacturing method design a three-wire L-N-G protection on a zinc oxide ceramic body to improve product life and reliability.

The secondary objective of the present invention is to provide a tri-phase surge protector and its manufacturing method that can achieve the effect of connecting two, three, or more surge protectors in parallel by appropriately adjusting the area, and also can overcome the surge attack and an incapability of starting if different surge protectors (corresponding to different breakdown voltages) are connected in series between two same lines. If different surge protectors are started successively, the low-impedance surge protector will bear a larger current (for the connection in parallel) since the remained impedance of each surge protector is different. After the use of a long time, the surge protector will be deteriorated seriously. If any one of the surge protectors fails, then several surge protectors connected in parallel will lose its original intended function.

The third objective of the present invention is to solve the failure problem of the prior art surge protector that requires an overheat protecting device for each surge protector, so as to save the overheat protecting device and lower its cost while maintaining a reasonable protection function.

The fourth objective of the present invention is to provide a better heat dissipating solution. Since the method of eliminating external energies of the surge protector produces joule heat, the temperature will rise if the heat dissipating rate is lower than the speed of producing heat. As a result, the surge protector will operate abnormally and the surge protector will be burned. Although the surge working area between any two lines is very close to the area of a single surge protector, the total volume is three times of the original single surge protector. For the same surge energy, the temperature rise of the tri-phase surge protector of the invention is smaller. Since the overall area is larger, the heat dissipating rate of the tri-phase surge protector can be increased greatly. Therefore, a better protection is provided for intensive continuous surge attacks to improve product life and reliability.

To achieve the foregoing objectives, the present invention provides a tri-phase surge protector comprising: a first zinc oxide ceramic body; a first electrode layer disposed on a surface of the first zinc oxide ceramic body and having a first electrode thereon, and the first electrode includes a first terminal; a second electrode layer disposed on another surface of the first zinc oxide ceramic body; a second zinc oxide ceramic body disposed on the second electrode layer; a third electrode layer disposed on another surface of the second zinc oxide ceramic body and having a second electrode thereon, and the second electrode includes a second terminal; a third zinc oxide ceramic body installed on the second electrode layer and disposed at a surface of the second zinc oxide ceramic body; and a fourth electrode layer disposed on another surface of the third zinc oxide ceramic body and having a third electrode, and the third electrode includes a third terminal.

To achieve the foregoing objectives, the present invention provides a method for manufacturing a tri-phase surge protector comprising the steps of: providing a first zinc oxide ceramic body; depositing a first electrode layer on a surface of the first zinc oxide ceramic body, and the first electrode layer includes a first electrode, and the first electrode includes a first terminal; depositing a second electrode layer on another surface of the first zinc oxide ceramic body; depositing a second zinc oxide ceramic body on the second electrode layer; depositing a third electrode layer on another surface of the second zinc oxide ceramic body, and the third electrode layer includes a second electrode, and the second electrode includes a second terminal; depositing a third zinc oxide ceramic body on the second electrode layer and disposed at a surface of the second zinc oxide ceramic body; and depositing a fourth electrode layer on another surface of the third zinc oxide ceramic body, and the fourth electrode layer includes a third electrode, and the third electrode includes a third terminal.

To make it easier for our examiner to understand the objective of the invention, its structure, innovative features, and performance, we use a preferred embodiment together with the attached drawings for the detailed description of the invention.

DETAILED DESCRIPTION OF THE PREFERRED EMBODIMENTS

Figure 1:
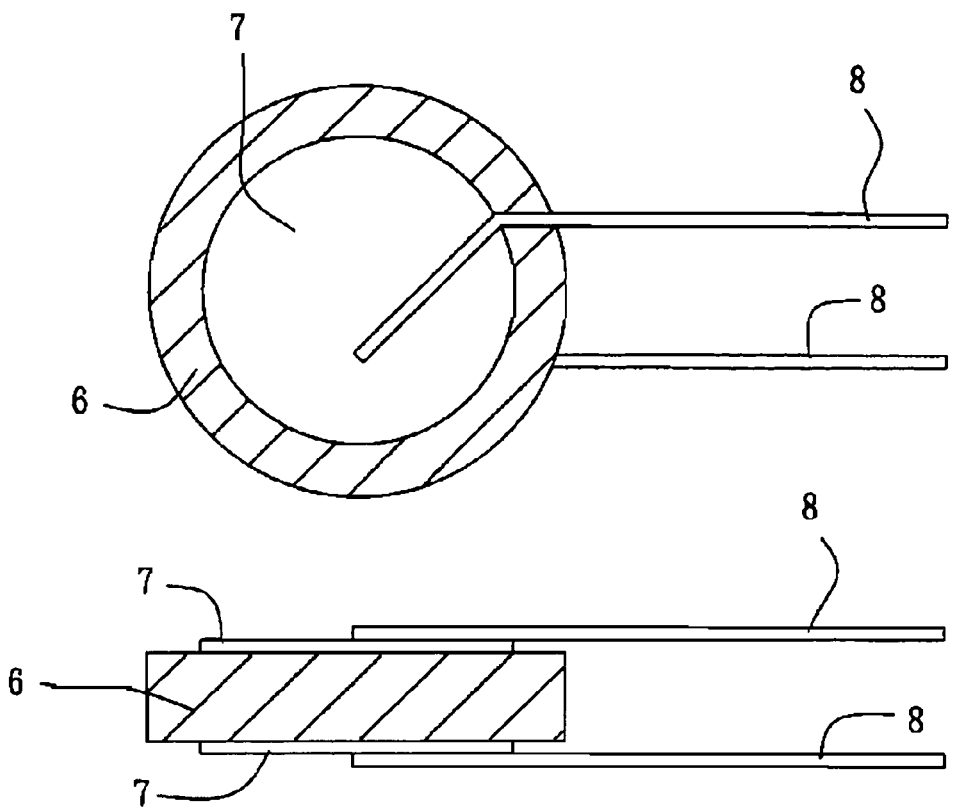
FIG. 1 shows a bottom view and a side view of a prior art surge protector.
Figure 2:
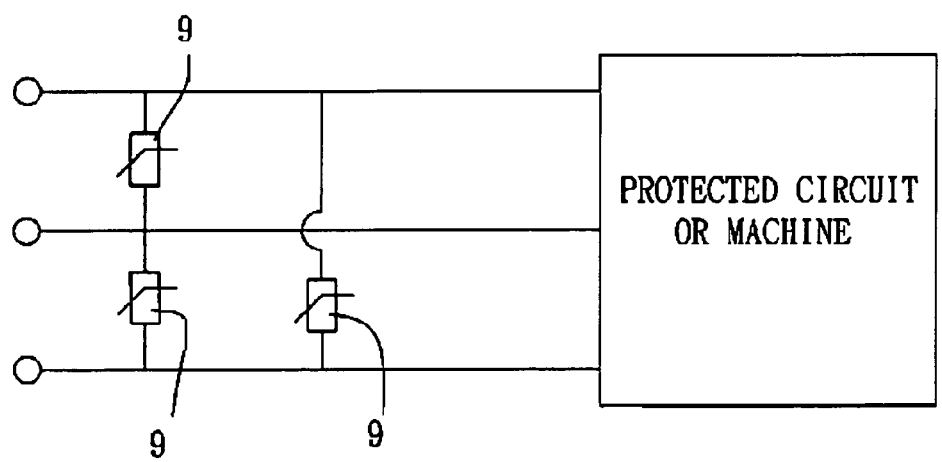
FIG. 2 is a schematic view of a prior art surge protector used for protecting a three-wire L-N-G power supply.
Figure 3A:
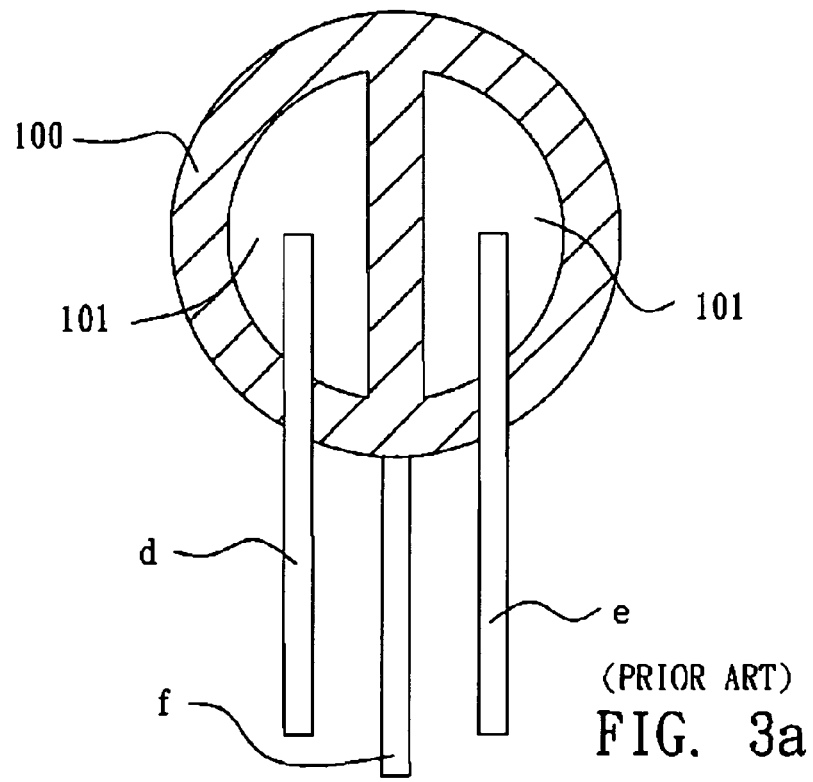
FIG. 3(a) is a bottom view of a three-terminal single-layer device as disclosed in JPN Pat. No. 59-5601.
Figure 3B:
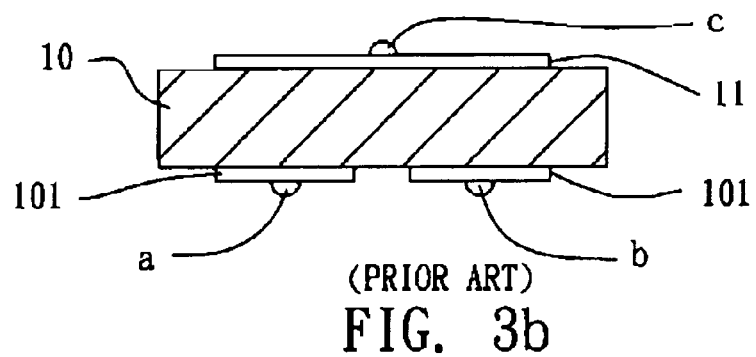
FIG. 3(b) is a side view of a three-terminal single-layer device as disclosed in JPN Pat. No. 59-5601.
Figure 3C:
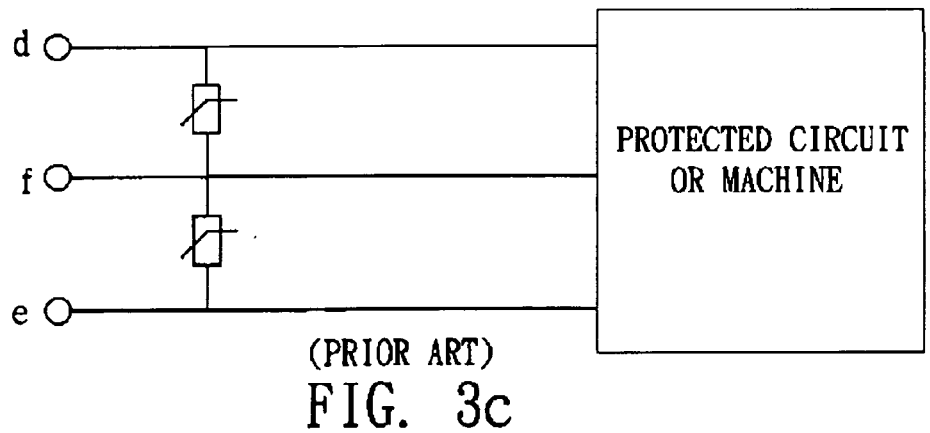
FIG. 3(c) is an equivalent circuit diagram of a three-terminal single-layer device as disclosed in JPN Pat. No. 59-5601.
Figure 4A:
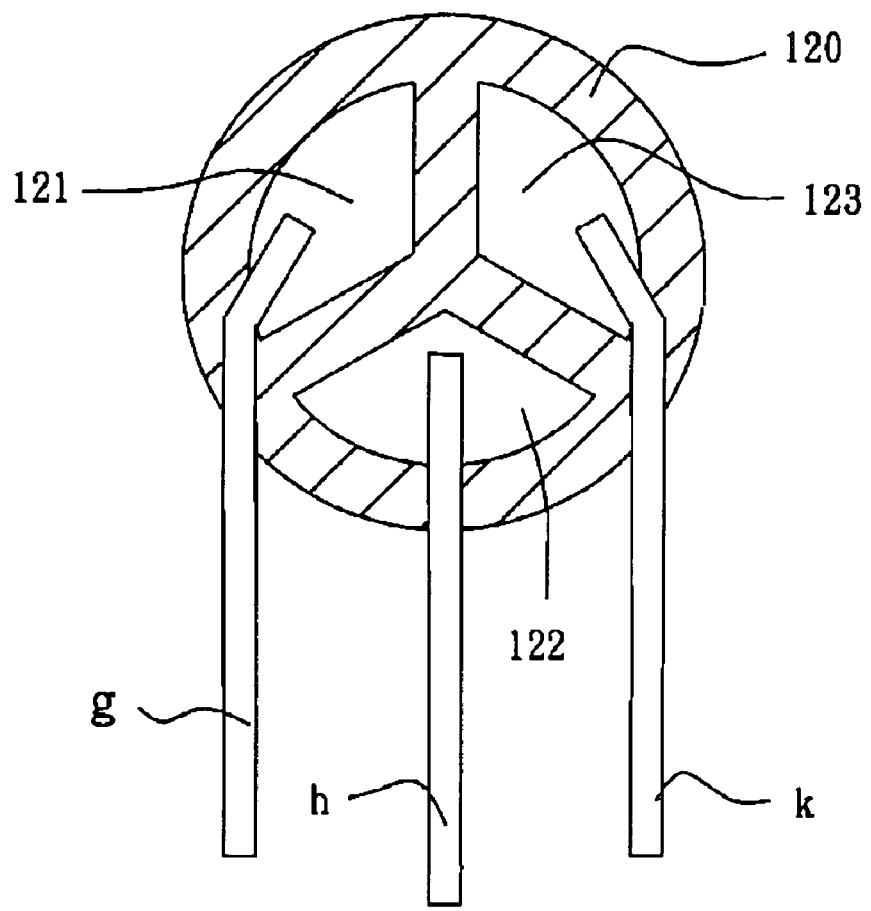
FIG. 4(a) is a bottom view of a three-terminal single-layer device as disclosed in R.O.C. Pat. No. 313713.
Figure 4B:
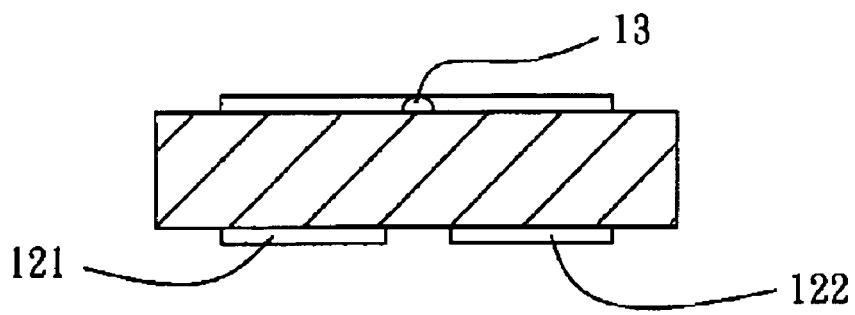
FIG. 4(b) a side view of a three-terminal single-layer device as disclosed in R.O.C. Pat. No. 313713.
Figure 5A:
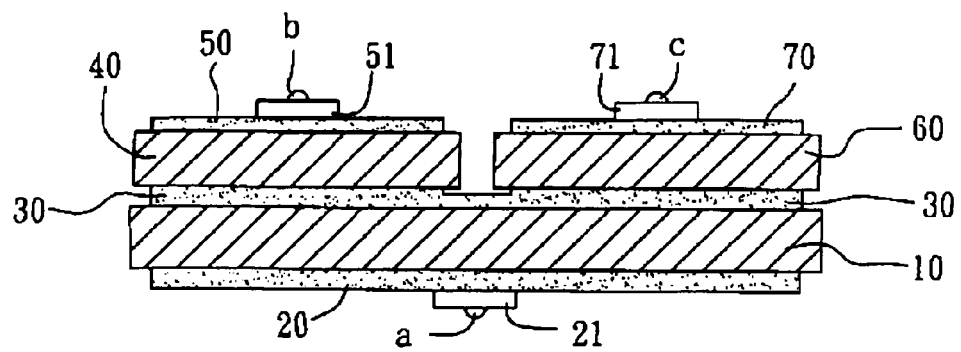
FIG. 5(a) is a cross-sectional view of a tri-phase surge protector according to a first preferred embodiment of the present invention.
Figure 5B:
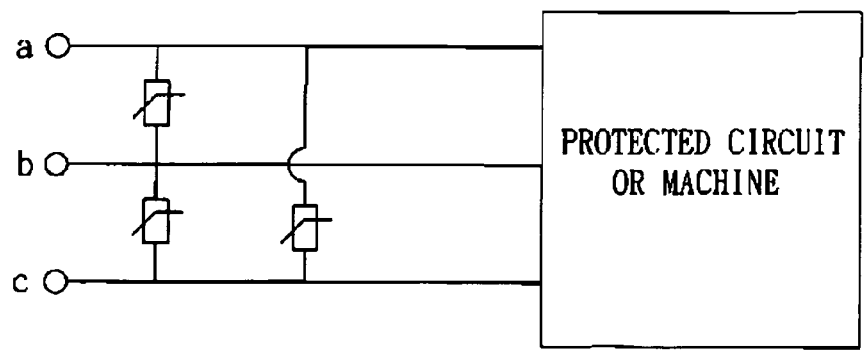
FIG. 5(b) is a schematic equivalent circuit diagram of a tri-phase surge protector according to a first preferred embodiment of the present invention.

Referring to FIGS. 5(a) and 5(b) respectively for the cross-sectional view and the schematic equivalent circuit diagram of a tri-phase surge protector according to a preferred embodiment of the present invention, the tri-phase surge protector comprises a first zinc oxide ceramic body 10, a first electrode layer 20, a second electrode layer 30, a second zinc oxide ceramic body 40, a third electrode layer 50, a third zinc oxide ceramic body 60, and a fourth electrode layer.

The first zinc oxide ceramic body 10 has the same functions as a zinc oxide ceramic body 6 of a prior art surge protector for providing a breakdown path for the surge protector, and the first electrode layer 20 is disposed on a surface of the first zinc oxide ceramic body 10 and having a first electrode 21, and the first electrode 21 includes a first terminal a, wherein the first terminal a is but not limited to a grounding terminal (Ground).

The second electrode layer 30 is disposed on another surface of the first zinc oxide ceramic body 10.

The second zinc oxide ceramic body 40 is disposed on the second electrode layer 30 and has the same function as a zinc oxide ceramic body 6 of a prior art surge protector for providing a breakdown path for the surge protector.

The third electrode layer 50 is disposed on another surface of the second zinc oxide ceramic body 40 and having a second electrode 51, and the second electrode 51 includes a second terminal b, wherein the second terminal b is but not limited to a fire line input terminal (Line).

The third zinc oxide ceramic body 60 is disposed on the second electrode layer 30 and at one side of the second zinc oxide ceramic body 40, and having the same functions of a zinc oxide ceramic body 6 of a prior art surge protector for providing a breakdown path for the surge protector.

The fourth electrode layer 70 is disposed on another surface of the third zinc oxide ceramic body 60 and having a third electrode 71, and the third electrode 71 includes a third terminal c thereon, wherein the third terminal c is but not limited to a neutral input terminal (Neutral).

The first electrode layer 20, second electrode layer 30, third electrode layer 50, and fourth electrode layer 70 are preferably made of a silver paste.

Referring to FIG. 5(a), the first electrode 21 and the second electrode 51 will be used as the standard working area for starting, if the second terminal b with respect to both ends of the first terminal a has an abnormal voltage, such that a current will pass through the first electrode layer 20, second electrode layer 30 and the third electrode layer 50 to eliminate surge energy by heating. If the third terminal c with respect to both sides of the first terminal a has an abnormal voltage, then the first electrode 21 and the third electrode 71 will be used as the standard working area for starting, such that a current will pass through the first electrode layer 20, second electrode layer 30, and fourth electrode layer 70 to eliminate surge energy by heating. If the third terminal c with respect to both ends of the second terminal b has an abnormal voltage, then the second electrode 51 and the third electrode 71 will be used as the standard working area for starting, such that a current will pass through the third electrode layer 50, second electrode layer 30, and fourth electrode layer 70 to eliminate the surge energy by heating.

As described above, the tri-phase surge protector of the invention can simultaneously protect abnormal situations among the three lines. The heat produced after the protection is enabled can be dissipated completely from the whole volume (or surface area) such that the surge current passing through the area can be reduced into half to improve product life and reliability.

Figure 6:
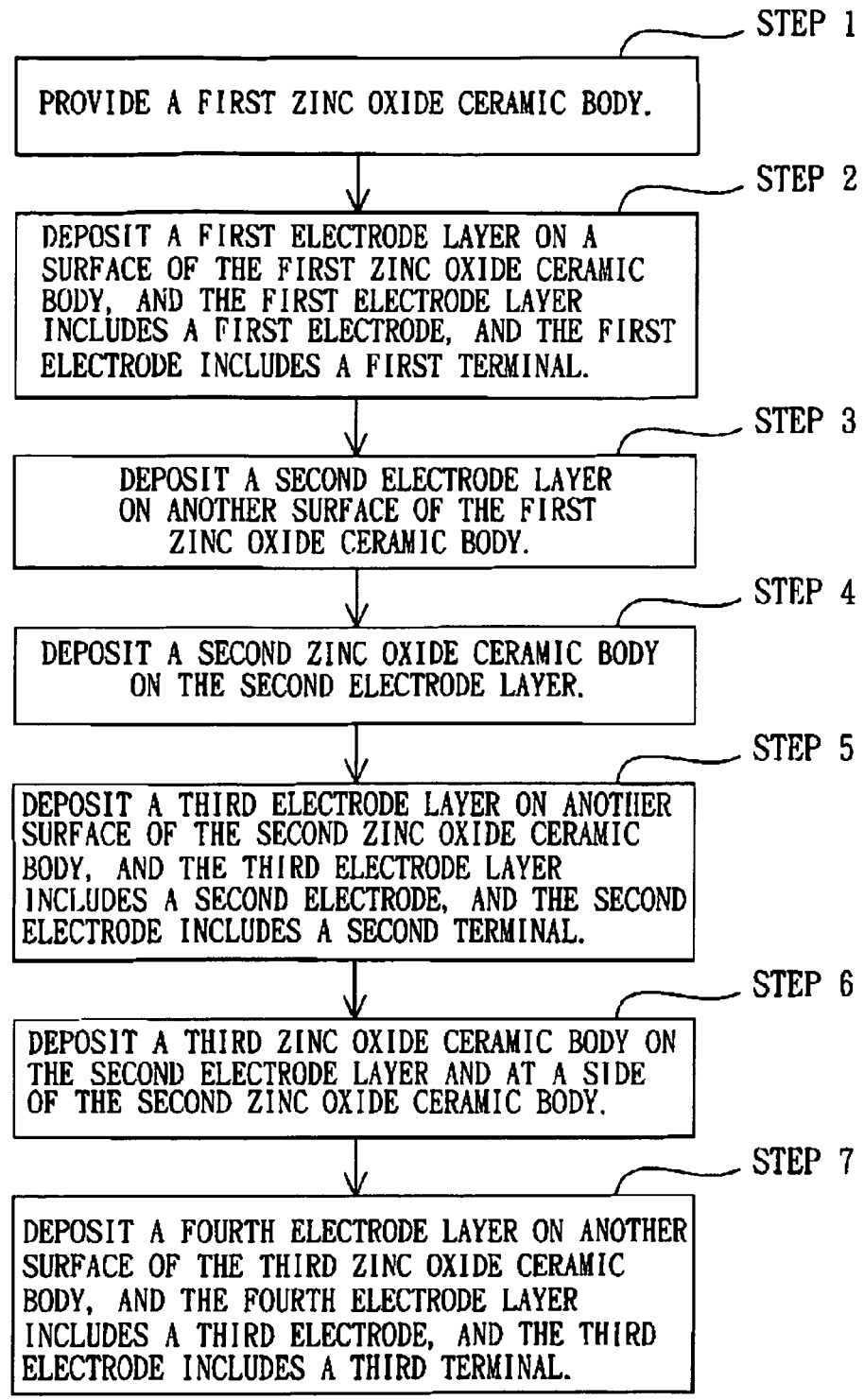
FIG. 6 is a flow chart of the method for manufacturing a tri-phase surge protector according to a second preferred embodiment of the present invention.

Referring to FIG. 6 for the flow chart of a method for manufacturing a tri-phase surge protector according to a second preferred embodiment of the present invention, the method for manufacturing the tri-phase surge protector comprises the steps of: (Step 1) providing a first zinc oxide ceramic body 10; (Step 2) depositing a first electrode layer 20 on a surface of the zinc oxide ceramic body 10, and the first electrode layer 20 includes a first electrode 21, and the first electrode 21 includes a first terminal a; (Step 3) depositing a second electrode layer 30 on another surface of the first zinc oxide ceramic body 10; (Step 4) depositing a second zinc oxide ceramic body 40 on the second electrode layer 30; (Step 5) depositing a third electrode layer 50 on another surface of the second zinc oxide ceramic body 40, and the third electrode layer 50 includes a second electrode 51, and the second electrode 51 includes a second terminal b; (Step 6) depositing a third zinc oxide ceramic body 60 on the second electrode layer 30 and at a side of the second zinc oxide ceramic body 40; and (Step 7) depositing a fourth electrode layer 70 on another surface of the third zinc oxide ceramic body 60, and the fourth electrode layer 70 includes a third electrode 71, and the third electrode includes a third terminal c.

In Step 1, the first zinc oxide ceramic body 10 has the same functions as the zinc oxide ceramic body 6 of a prior art surge protector for providing a breakdown path for the surge protector.

In Step 2, the first terminal a is but not limited to a grounding terminal (Ground).

In Step 4, the second zinc oxide ceramic body 40 is disposed on the second electrode layer 30 and has the same functions as a zinc oxide ceramic body 6 of a prior art surge protector for providing a breakdown path for the surge protector.

In Step 5, the second terminal b is but not limited to a fire line input terminal (Line).

In Step 6, the third zinc oxide ceramic body 60 is installed on the second electrode layer 30 and at a side of the second zinc oxide ceramic body 40, and its function is the same as a zinc oxide ceramic body 6 of a prior art surge protector for providing a breakdown path for the surge protector.

In Step 7, the third terminal c is but not limited to a neutral input terminal (Neutral).

The first electrode layer 20, second electrode layer 30, third electrode layer 50, and fourth electrode layer 70 are preferably made of a silver paste.

In the tri-phase surge protector manufactured by the manufacturing method of the present invention, the first electrode 11 and the second electrode 51 are used as a standard working area for starting, if the second terminal b with respect to both ends of the first terminal a has an abnormal voltage, such that a current passes through the first electrode layer 20, second electrode layer 30, and third electrode layer 50 to eliminate surge energy by heating; the first electrode 11 and the third electrode 61 are used as a standard working area for starting, if the third terminal c with respect to both ends of the first terminal a has an abnormal voltage, such that a current passes through the first electrode layer 20, second electrode layer 30, and fourth electrode layer 70 to eliminate surge energy by heating; and the second electrode 51 and the third electrode 61 are used as a standard working area for starting, if the third terminal c with respect to both ends of the second terminal b has an abnormal voltage, such that a current passes through the third electrode layer 50, second electrode layer 30, and fourth electrode layer 70 to eliminate surge energy by heating.

As described above, the tri-phase surge protector manufactured by the manufacturing method of the present invention can simultaneously protect the abnormal situation among the three lines. The heat produced after starting the surge protector can be dissipated completely by the whole volume (or surface area) to reduce the surge current passing the area in half, so as to improve product life and reliability.

In summation of the description above, the tri-phase surge protector of the invention has the following advantages over the prior art surge protector:

1. The internal circuit design is used to produce an equivalent surge protector capable of having three independent working on the surge protector component to provide a full protection among the three lines.

2. It is necessary to perform the breakdown actions for one or two times between two lines for each time when the surge protector starts and completes the protection, such that the current passing the area can be reduced into half to improve product life and liability.

3. Only three terminal points are needed among the three lines, and thus the invention can eliminate the three surge protectors used in the prior art, and save the manufacturing cost of six soldering points.

While the invention has been described by way of example and in terms of a preferred embodiment, it is to be understood that the invention is not limited thereto. To the contrary, it is intended to cover various modifications and similar arrangements and procedures, and the scope of the appended claims therefore should be accorded the broadest interpretation so as to encompass all such modifications and similar arrangements and procedures.

In summation of the above description, the present invention herein enhances the performance than the conventional structure and further complies with the patent application requirements and is submitted to the Patent and Trademark Office for review and granting of the commensurate patent rights.

What is claimed is:

1. A tri-phase surge protector, comprising:
   a first zinc oxide ceramic body;
   a first electrode layer, disposed on a surface of said first zinc oxide ceramic body and having a first electrode thereon, and said first electrode including a first terminal;
   a second electrode layer; disposed on another surface of said first zinc oxide ceramic body;
   a second zinc oxide ceramic body, disposed on said second electrode layer;
   a third electrode layer, disposed on another surface of said second zinc oxide ceramic body and having a second electrode thereon, and said second electrode including a second terminal;
   a third zinc oxide ceramic body, disposed on said second electrode layer and at a side of said second zinc oxide ceramic body; and
   a fourth electrode layer, disposed on another surface of said third zinc oxide ceramic body and having a third electrode thereon, and said third electrode including a third terminal.

2. The tri-phase surge protector of claim 1, wherein said first electrode and said second electrode are used as a standard working area for starting, if said second terminal with respect to both ends of said first terminal has an abnormal voltage, such that a current passes through said first electrode layer, said second electrode layer, and said third electrode layer to eliminate surge energy by heating.

3. The tri-phase surge protector of claim 1, wherein said first electrode and said third electrode are used as a standard working area for starting, if said third terminal with respect to both ends of said first terminal has an abnormal voltage, such that a current passes through said first electrode layer, said second electrode layer, and said fourth electrode layer to eliminate surge energy by heating.

4. The tri-phase surge protector of claim 1, wherein said second electrode and said third electrode are used as a standard working area for starting, if said third terminal with respect to both ends of said second terminal has an abnormal voltage, such that a current passes through said third electrode layer, said second electrode layer, and said fourth electrode layer to eliminate surge energy by heating.

5. The tri-phase surge protector of claim 1, wherein said first electrode layer, said second electrode layer, said third electrode layer, and said fourth electrode layer are made of a silver paste.

6. The tri-phase surge protector of claim 1, wherein said first electrode, said second electrode, said third electrode, or said fourth electrode has an adjustable area for connecting a plurality of surge protectors in parallel.

7. A method for manufacturing a tri-phase surge protector, comprising the steps of:
providing a first zinc oxide ceramic body;
depositing a first electrode layer on a surface of said first zinc oxide ceramic body, and said first electrode layer including a first electrode, and said first electrode including a first terminal;
depositing a second electrode layer on another surface of said first zinc oxide ceramic body;
depositing a second zinc oxide ceramic body on said second electrode layer;
depositing a third electrode layer on another surface of said second zinc oxide ceramic body, and said third electrode layer including a second electrode, and said second electrode including a second terminal;
depositing a third zinc oxide ceramic body on said second electrode layer and at a side of said second zinc oxide ceramic body; and
depositing a fourth electrode layer on another surface of said third zinc oxide ceramic body, and said fourth electrode layer including a third electrode, and said third electrode including a third terminal.

8. The method of manufacturing a tri-phase surge protector of claim 7, wherein said first electrode and said second electrode are used as a standard working area for starting, if said second terminal with respect to both ends of said first terminal has an abnormal voltage, such that a current passes through said first electrode layer, said second electrode layer, and said third electrode layer to eliminate surge energy by heating.

9. The method of manufacturing a tri-phase surge protector of claim 7, wherein said first electrode and said third electrode are used as a standard working area for starting, if said third terminal with respect to both ends of said first terminal has an abnormal voltage, such that a current passes through said first electrode layer, said second electrode layer, and said fourth electrode layer to eliminate surge energy by heating.

10. The method of manufacturing a tri-phase surge protector of claim 7, wherein said third electrode and said second electrode are used as a standard working area for starting, if said third terminal with respect to both ends of said second terminal has an abnormal voltage, such that a current passes through said third electrode layer, said second electrode layer, and said fourth electrode layer to eliminate surge energy by heating.

11. The method of manufacturing a tri-phase surge protector of claim 7, wherein said first electrode layer, said second electrode layer, said third electrode layer, and said fourth electrode layer are made of a silver paste.

12. The method of manufacturing a tri-phase surge protector of claim 7, wherein said first electrode, said second electrode, said third electrode, or said fourth electrode has an adjustable area for connecting a plurality of surge protectors in parallel.

* * * * *